(No Model.) 2 Sheets—Sheet 1.

R. LOGGIE & J. MAZROLL.
CAN SOLDERING MACHINE.

No. 453,085. Patented May 26, 1891.

WITNESSES:
Chas. Nide
C. Sedgwick

INVENTORS:
R. Loggie
J. Mazroll
BY Munn & Co.
ATTORNEYS (No Model.) 2 Sheets—Sheet 2.

R. LOGGIE & J. MAZROLL.
CAN SOLDERING MACHINE.

No. 453,085. Patented May 26, 1891.

WITNESSES:
Chas. Nida
C. Sedgwick

INVENTORS,
R. Loggie
J. Mazroll
BY Munn & Co.
ATTORNEYS

UNITED STATES PATENT OFFICE.

ROBERT LOGGIE AND JOSEPH MAZROLL, OF BLACK BROOK, CANADA; SAID MAZROLL ASSIGNOR TO SAID LOGGIE.

CAN-SOLDERING MACHINE.

SPECIFICATION forming part of Letters Patent No. 453,085, dated May 26, 1891.

Application filed January 21, 1891. Serial No. 378,511. (No model.)

*To all whom it may concern:*

Be it known that we, ROBERT LOGGIE and JOSEPH MAZROLL, both of Black Brook, in the county of Northumberland, New Brunswick, and Dominion of Canada, have invented a new and Improved Can-Soldering Machine, of which the following is a full, clear, and exact description.

The object of the invention is to provide a new and improved machine for soldering sheet-metal cans, and one which is simple and durable in construction and serves to quickly and effectively solder the end caps or heads to the can-body.

The invention consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1:
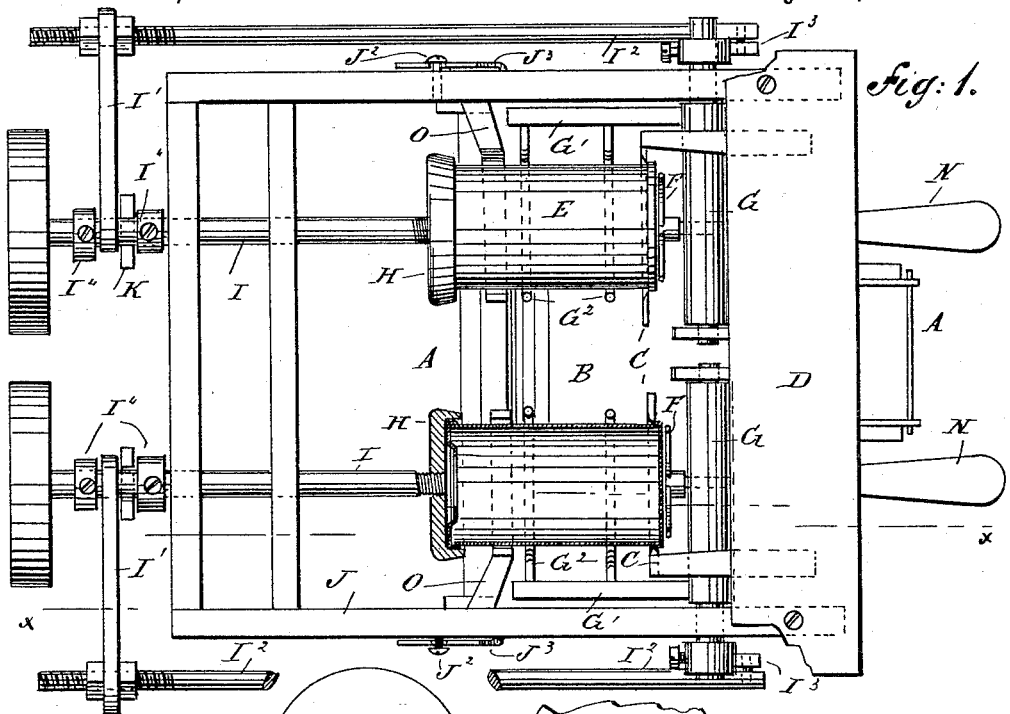
Figure 2:
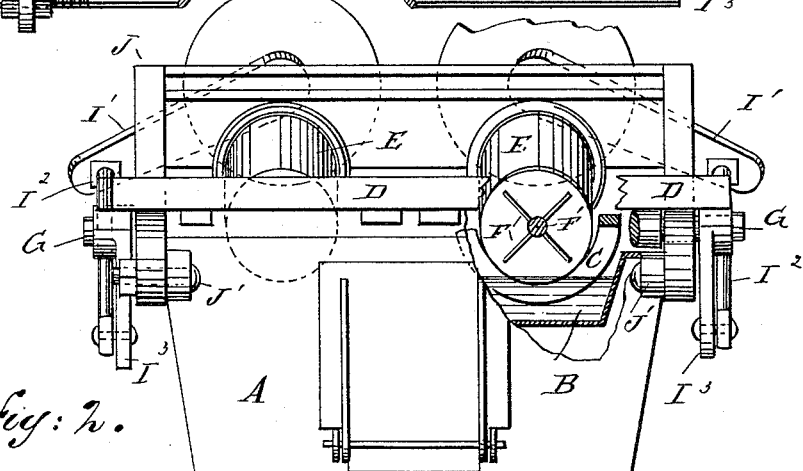
Figure 3:
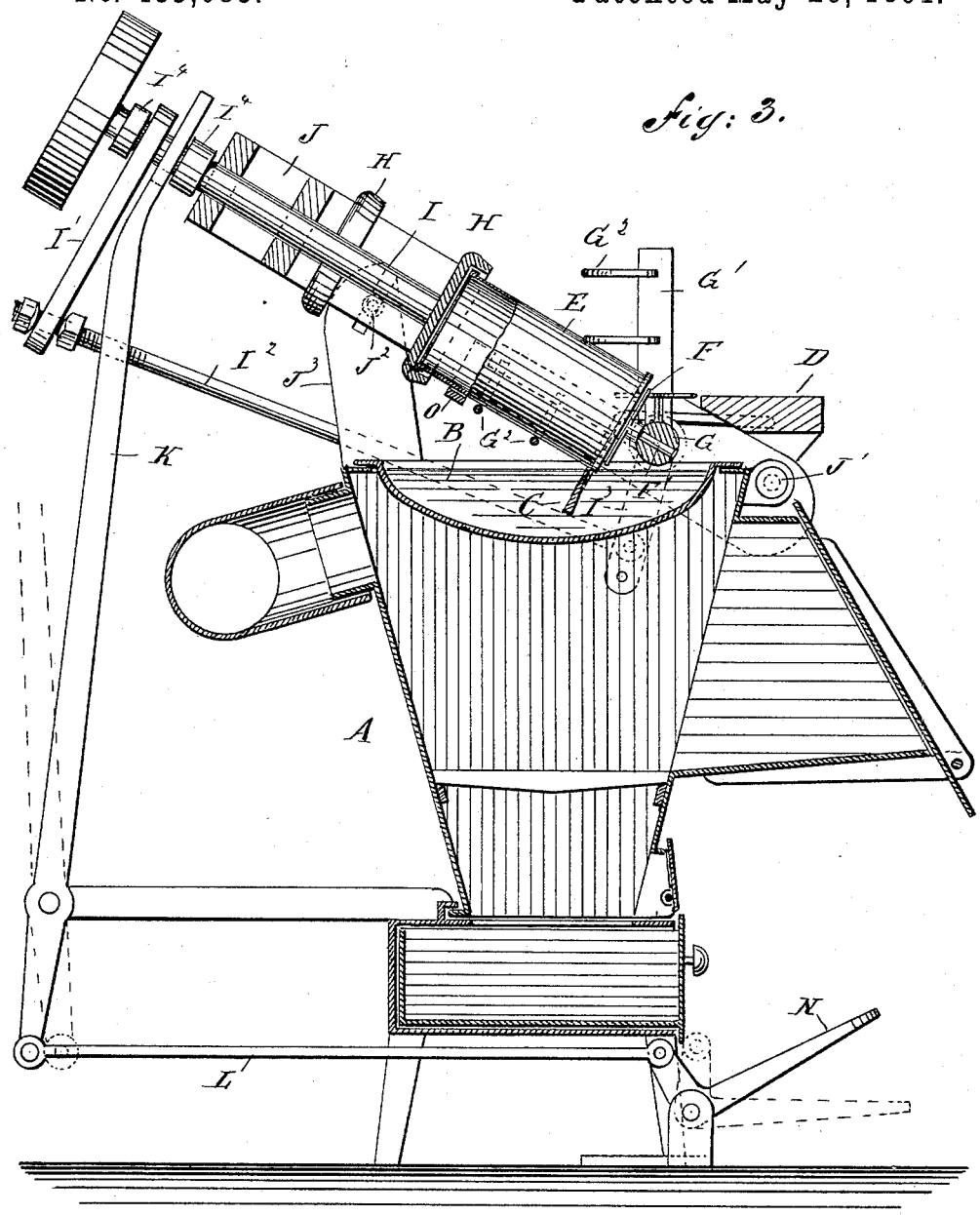

Figure 1 is a plan view of the improvement, with parts in section and parts broken out. Fig. 2 is a front elevation of the same, and Fig. 3 is a sectional side elevation of the same on the line $x\ x$ of Fig. 1.

The improved can-soldering machine is provided with a suitably-constructed furnace A, supporting on top an open receptacle B, containing solder for soldering the can. Into the molten solder contained in this receptacle B extends a soldering-iron C, which is segmental in shape and has its inner edge sharpened to engage the seam formed between the can-body and the head of the can E. This soldering-iron C is fastened to a table D, extending transversely on the top of the furnace and on which the cans to be soldered are placed.

The lower head of the can-body E is adapted to rest on a spider or a disk F, provided with a shank F', mounted to turn loosely in a transversely-extending shaft G, mounted to turn in suitable bearings. The upper end or head of the can E is adapted to be engaged by a flanged disk H, secured on the lower end of the shaft I, mounted to turn in suitable bearings in a frame J, which also contains the bearings for the shaft G previously mentioned. The shaft I is slightly inclined, as is plainly illustrated in Fig. 3, and when the can E is in place on the spider F and the disk H, then the axis of the shaft I coincides with the axis of the shank F' of the spider F. The frame J is preferably fulcrumed at J' on the furnace and is connected by set-screws J² with arms J³, extending upward from the rear of the furnace A. (See Fig. 3.) The upper or outer end of the shaft I is connected by a suitable mechanism with machinery for imparting a continuous rotary motion to the said shaft. The upper end of the shaft I is also connected by an arm I' with a link I², pivotally connected with an arm I³, secured on the shaft G previously mentioned, the said arm I' being preferably held between an adjustable collar I⁴ and the forked end of a lever K, which engages with its forked end the upper end of the shaft I and abuts against a second collar I⁴ held in the said shaft. The lever K is fulcrumed on a bracket projecting from the rear of the furnace A, and the lower end of the said lever is pivotally connected by a link L with a bell-crank lever N, projecting with one arm or treadle to the front of the machine, so that the operator can conveniently actuate the said bell-crank lever with his foot.

When the operator presses on the bell-crank lever, the lever K swings and by its forked end engaging the upper end of the shaft I moves the latter outward, so that the disk H disengages the upper end of the can. At the same time the outward movement of the shaft I causes the swinging of the shaft G by means of the arms I' I³ and the link I², so that the spider or disk F moves the can-body E into a vertical position to be removed from the said spider and to permit the operator to place a can to be soldered on the spider. By the operator releasing the pressure on the bell-crank lever N the shaft I slides back to its former position, so that the can to be soldered resting on the spider F is carried by the latter into the inclined position shown in Fig. 3, and the top is engaged by the downward-sliding flanged disk H of the shaft I. In order to hold the can-body in position while it is being soldered and to prevent its displacement when put onto the spider F, the shaft G is provided with an arm G', from which project two segmental arms G², adapted to engage the periphery of the can-body, as is plainly illustrated in Figs. 1 and 3. As the segmental arms G² move with the shaft G, the operator can conveniently place the can-body onto the disk or spider F, the periphery of the can-body resting against the said segmental arms G². In order to support the upper part of the can-body when the soldering takes place, a fixed segmental arm O is preferably secured to the frame J. It is understood that when the can-body E is resting between the spider F and the revolving disk H then the can-body turns with the said revolving disk, the latter being sufficiently heavy to press with the required force against the upper part of the can-body, so that the latter is carried along by the revolving disk. As the can-body revolves, the spider F turns with it. The solder in the receptacle B is held in a molten state by the heat from the furnace A, and is at such a level as to be slightly above the sharp point of the soldering-iron C, as is plainly indicated in Fig. 2. As the soldering-iron is so arranged as to be at the seam of the head or cap of the can and the can-body, the solder is carried on the revolving of the can to all parts of the seam, thus effectively soldering the head to the can-body. As soon as the can is soldered, the operator presses on the bell-crank lever N, so that the shaft I moves outwardly, the shaft G is turned, and can E, by the arms G² and the spider F, is moved into a vertical position to be removed and replaced by a new can to be soldered.

Having thus fully described our invention, we claim as new and desire to secure by Letters Patent—

1. In a can-soldering machine, the combination, with a disk mounted to turn and adapted to rotate the can, of a spider mounted to turn loosely and to swing and adapted to support the lower end of the can, a soldering-iron held in contact with molten solder and engaging the seam of the can, and means, substantially as described, for imparting a sliding movement to the said disk and at the same time swinging the said spider, substantially as shown and described.

2. In a can-soldering machine, the combination, with a shaft mounted to turn, of segmental arms supported by the said shaft and adapted to support the can-body, and a spider mounted to turn loosely in the said shaft and adapted to engage the lower head of the can, substantially as shown and described.

3. In a can-soldering machine, the combination, with a shaft mounted to turn and to slide and a flanged disk held on the said shaft and adapted to engage the upper end of the can, of a spider adapted to engage the lower end of the can, a second shaft mounted to turn and in which the said spider is mounted to turn loosely, the shank or axle of the spider extending at right angles to the said second shaft, and segmental arms projecting from the said second shaft to engage the periphery of the can-body, substantially as shown and described.

4. In a can-soldering machine, the combination, with a shaft mounted to turn and to slide and a flanged disk held on the shaft and adapted to engage the upper end of the can, of a spider adapted to engage the lower end of the can, a second shaft mounted to turn and in which the said spider is mounted to turn loosely, the shank or axle of the spider extending at right angles to the said second shaft, segmental arms projecting from said second shaft to engage the periphery of the can-body, and intermediate mechanism connecting the said two shafts with each other in such a manner that when the first-named shaft slides the other is caused to turn, substantially as shown and described.

5. In a can-soldering machine, the combination, with a shaft mounted to turn and to slide and a disk supported thereon and adapted to engage the upper end of the can-body, of a means, substantially as described, for imparting a sliding motion to the said shaft, a second shaft mounted to turn and adapted to be actuated by the sliding of the first-named shaft, a spider mounted loosely in the said second shaft and adapted to engage the lower end of the can, and segmental arms projecting from the said second shaft and adapted to engage the periphery of the can-body, substantially as shown and described.

6. In a can-soldering machine, the combination, with a shaft mounted to turn and to slide and a disk supported thereon and adapted to engage the upper end of the can-body, of means, substantially as described, for imparting a sliding motion to the said shaft, a second shaft mounted to turn and adapted to be actuated by the sliding of the first-named shaft, a spider mounted loosely in the said second shaft and adapted to engage the lower end of the can, segmental arms projecting from the said second shaft and adapted to engage the periphery of the can-body, and a segmental soldering-iron having an inner sharpened edge adapted to engage the seam of the can and extending into molten solder, substantially as shown and described.

7. The combination, with a solder-receptacle and a soldering-iron in connection therewith, of a shaft provided with can-supporting arms, a revoluble spider mounted in said shaft, a second shaft mounted to revolve and to slide and at right angles to the first shaft and carrying a fixed disk, and means for rocking the spider and carrying-shaft and simultaneously sliding the disk-shaft, substantially as shown and described.

ROBERT LOGGIE.
JOSEPH MAZROLL.

Witnesses.
L. J. TWEEDIE,
WILLIAM M. SALTER.